Dec. 11, 1956  A. L. HAYNES ET AL  2,773,396
POWER STEERING MECHANISM
Filed June 15, 1955  2 Sheets-Sheet 1

A. L. HAYNES
C. E. RAWDEN
W. A. VAN WICKLIN, JR
INVENTORS

BY
ATTORNEYS

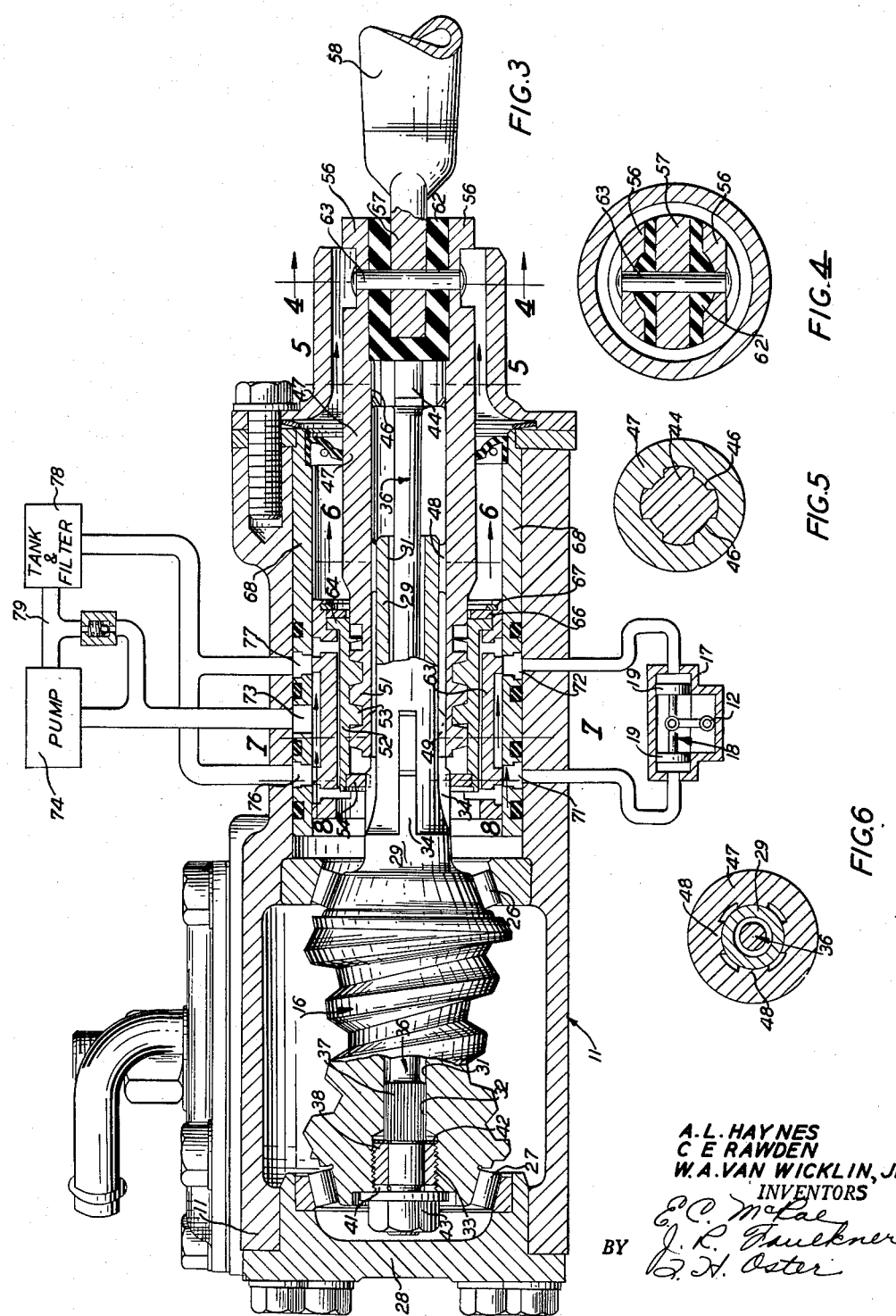

United States Patent Office 2,773,396
Patented Dec. 11, 1956

2,773,396
POWER STEERING MECHANISM

Alex L. Haynes and Cecil E. Rawden, Detroit, and Warren A. Van Wicklin, Jr., Dearborn, Mich., assignors to Ford Motor Company, Dearborn, Mich., a corporation of Delaware Application June 15, 1955, Serial No. 515,734

8 Claims. (Cl. 74—388)

This invention relates generally to power steering mechanisms for motor vehicles, and has particular reference to a steering mechanism in which the manual steering effort is augmented by a hydraulic power unit whenever the steering load exceeds a predetermined amount.

The structure of the present application is an improvement over applicants' Patent 2,685,211, dated August 3, 1954. An object of the present invention is to provide a compact unit effecting economies in manufacture. A relatively short torsion bar is utilized, and the torsionally distortable portion of the bar is located concentrically within an axial bore formed in the steering gear worm and worm extension. The worm extension forms a pilot for an externally threaded non-deformable sleeve connected to the upper end of the torsion bar. This sleeve is relatively short, and meshes with an internally threaded nut splined to the worm extension for axial movement relative thereto but for rotation therewith. A valve spool is connected to the nut for axial movement therewith to control the operation of the servo unit to furnish power to the steering mechanism when required. In addition, co-operable portions are formed on the worm extension and the non-deformable threaded sleeve to enable the worm to be manually operated in the event of failure of the power mechanism. The use of a short sleeve and torsion bar housed within the steering gear housing permits the use of a single tube as a steering post and enables a flexible vibration dampening to be incorporated in the latter.

Other objects and advantages of this invention will be made more apparent as this description proceeds, particularly when considered in connection with the accompanying drawings, in which:

Figure 3 is an enlarged vertical cross sectional view taken on the plane indicated by the line 3—3 of Figure 2.

Figure 1:
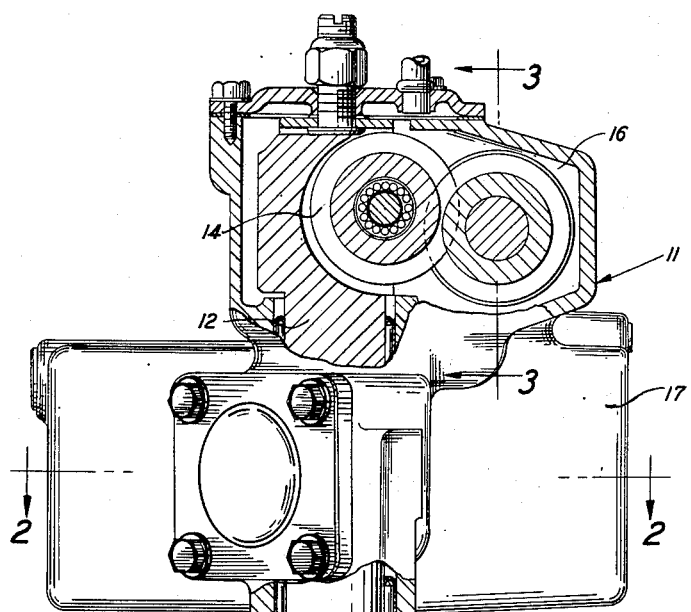
Figure 1 is a side elevational view, partly in section, of the power steering mechanism of the present invention.
Figure 2:
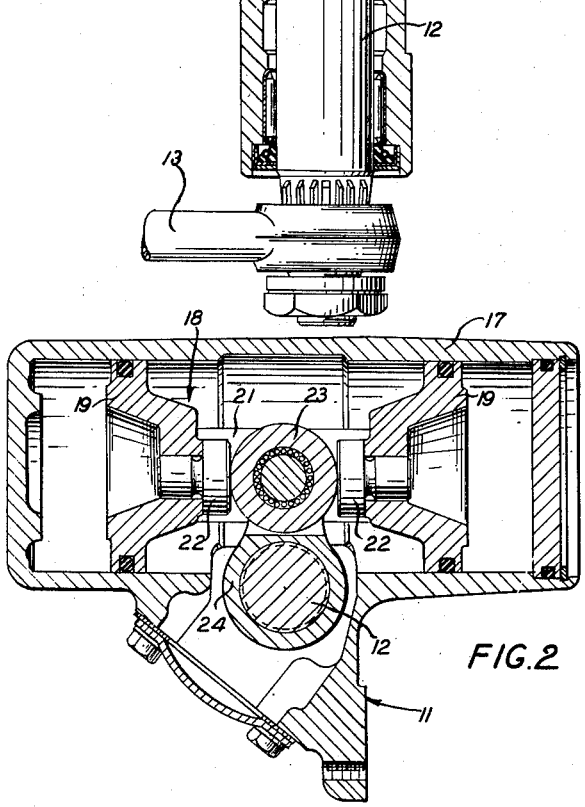
Figure 2 is a horizontal cross sectional view taken on the plane indicated by the line 2—2 of Figure 1.

Figures 4 to 8 inclusive are transverse cross sectional views taken on the planes indicated by the lines 4—4 to 8—8 inclusive respectively, of Figure 3.

Referring now more particularly to the drawing, the reference character 11 indicates the housing of the steering gear mechanism of the present invention. Supported within the housing 11 is a generally vertical steering shaft 12 carrying a conventional pitman arm 13 at its lower end, which in turn is connected by conventional linkage (not shown) to the steerable front wheels of a motor vehicle. At its upper end the steering shaft 12 rotatably supports a worm wheel 14 meshing with a worm 16.

The housing 11 is formed with an integral cylinder 17 extending generally at right angles to the steering shaft 12 adjacent an intermediate portion of the latter. Reciprocably mounted within the cylinder is a piston 18 having spaced heads 19 interconnected by means of an axially extending strut 21. Pins 22 extend inwardly from the piston heads 19 and engage opposite sides of a roller 23 mounted upon the ends of a bifurcated crank arm 24, the latter being splined to the steering shaft 12 intermediate the connections of the latter to the pitman arm 13 and the worm wheel 16. Suitable conduits (not shown) extend from opposite ends of the cylinder 17 to permit fluid to be admitted and exhausted therefrom to reciprocate the piston 18 and, through the roller 23 and crank arm 24, apply power assistance to the steering shaft 12 to augment the manual steering effort applied through the worm 16.

The worm 16 is rotatably mounted in the steering gear housing 11 by means of a tapered roller bearing assembly 26 supported in the housing and a second tapered roller bearing assembly 27 supported within an end cap 28 bolted to the end of the housing 11. The worm 16 is formed with an integral extension 29, and the worm and worm extension are formed with an axial bore 31 extending therethrough. Adjacent its lower end the bore 31 is formed with a serrated portion 32 and an internally threaded portion 33. The external surface of the worm extension 29 is formed with four equally spaced narrow splines 34 with each of the splines having a stepped external surface.

A relatively short torsion bar 36 extends through the bore 31 in the worm 16 and worm extension 29, and is provided with an externally serrated portion 37 slidably but nonrotatably engaging the serrated portion 32 of the worm bore. A hollow screw 38 is sleeved on the reduced end portion 39 of the torsion bar 36 below the serrated portion 37, and threadedly engages the threaded portion 33 of the worm bore. The lower end of the screw 38 is provided with a notch 41 for engagement by a suitable tool to adjust the screw axially within the worm bore. After suitable adjustment, as will be explained more in detail hereinafter, the torsion bar 36 is clamped in the axially adjusted position determined by the screw 38 by means of a washer 42 between the screw 38 and the serrated portion 37 of the bar, and a washer and nut assembly 43 threaded upon the end of the bar. It will be seen that this arrangement permits axial adjustment of the torsion bar relative to the worm 16.

The upper end of the torsion bar 36 is provided with an enlarged externally splined head 44 having four equally spaced splines formed on its periphery. The splined head 44 of the torsion bar is received within the end splines 46 of a sleeve 47. The splined connection between the torsion bar head 44 and the sleeve 47 is brazed to prevent relative axial movement between the torsion bar and the sleeve.

The sleeve 47 is also formed with an intermediate internally splined portion 48 and a lower splined portion 49. The splines 46, 48 and 49 correspond and are formed in one broaching operation. The intermediate splines 48 serve as a pilot between the upper end of the worm extension 29 and the sleeve 47, while the lower splined portion 49 forms a lost motion connection between the sleeve 47 and the worm extension 29, to provide, as will be described more in detail later, for manual operation of the steering gear mechanism in the event of breakage of the torsion bar.

Adjacent its lower end the sleeve 47 is formed with external square threads 51 having a helix angle of approximately 61 degrees. A nut 52 having corresponding internal threads 53 threadedly engages the threads 51 of the sleeve 47 for axial movement relative thereto. A splined washer 54 is brazed into the lower end of the nut 52 and engages the splines 34 on the worm extension 29 to permit relative axial movement between the nut 52 and the worm and worm extension, while insuring rotation of the nut with the worm.

As best seen in Figures 3 and 4, the upper end of the sleeve 47 is slotted to form bifurcations 56 embracing the flat tongue 57 formed at the lower end of a tubular steering post 58, the upper end of which is nonrotatably connected to the hub 59 of a steering wheel 61. A rubber insulator 62 is positioned between the tongue 57 of the steering post and the bifurcations 56 of the sleeve 47, and the connection is completed by a transversely extending pin 63. It will thus be seen that manual operation of the steering post 58 rotates the threaded sleeve 47, and also the upper end of the torsion bar 36 by reason of its splined connection 44—46 with the sleeve 47, through the medium of a rubber insulated connection to minimize the transmittal of vibrations to the steering wheel.

The rotation of the steering wheel and steering post 58 is thus transmitted through the torsion bar 36 to the worm 16. Since the intermediate portion of the torsion bar 36 is relatively small in diameter, it is torsionally distortable under load, and consequently the load afforded by the worm 16 and the interconnected steering mechanism between the worm and the front road wheels of the vehicle causes torsional distortion of the bar. This results in relative angular movement between the worm 16 and the sleeve 47. Since the nut 52 is splined by means of the washer 54 to the worm extension 29, relative rotation occurs between the nut 52 and the threaded sleeve 47, resulting in axial movement of the nut 52. As in our previous patent, referred to above, axial movement of the nut 52 results in axial movement of a valve spool 63 to control the operation of the piston 18 within the cylinder 17 to apply power to the steering shaft 12.

The connection between the nut 52 and the valve spool 63 comprises a flanged end 64 formed on the nut and seated against a shoulder in the bore of the valve spool 63, the connection being completed by means of a spacer 66 and a retaining ring 67.

The valve spool 63 reciprocates within a valve sleeve 68 fixedly mounted within the steering gear housing 11. As shown diagrammatically in Figure 3, ports 71 and 72 in the housing and valve sleeve are connected to opposite ends of the cylinder 17. Port 73 is connected to a pump 74 and ports 76 and 77 are connected to a reservoir tank and filter 78, the latter communicating by means of the conduit 79 to the pump 74.

In the neutral position of the valve spool as shown in Figure 3, free circulation of fluid at low pressure through the system is permitted. Upon axial movement of the valve spool 63 in either direction due to turning of the steering post 58 against the steering load of the worm 16, the valve spool 63 directs high pressure fluid from the pump to one end of the servo cylinder 17, while at the same time the opposite end of the cylinder is exhausted to the reservoir 78. Power assistance is thus supplied to the steering gear shaft 12 by reason of the servo cylinder 17.

Figure 7:
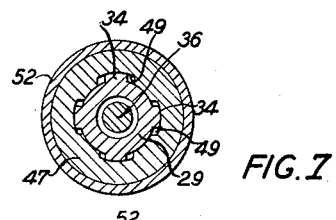
Figure 8:
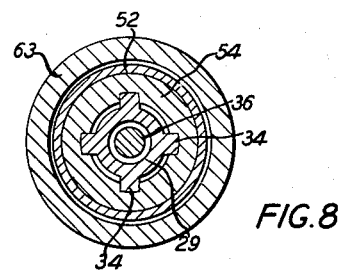

Referring to Figure 7, it will be noted that the external splines 34 on the worm extension 29 are narrower in width than the corresponding internal splines 49 at the lower end of the sleeve 47. The lost motion therebetween permits the normal relative angular movement resulting from torsional deflection of the torsion bar 36 to effect the axial movement of the valve spool, as described above. Upon breakage of the torsion bar 36, or upon failure of the hydraulic power system, manual steering would be available after the lost motion between the splines is taken up, to provide a safety feature.

It will be understood that the invention is not to be limited to the exact construction shown and described, but that various changes and modifications may be made without departing from the spirit and scope of the invention, as defined in the appended claims.

What is claimed is:

1. In a steering gear mechanism, a steering gear housing, a steering gear member rotatably mounted in said housing and having a bore formed therein, a torsion bar extending freely through the bore in said steering gear member and nonrotatably anchored at one end to said member, a manually operable member operably connected to said torsion bar at a point spaced from the anchored end thereof, a threaded part on said torsion bar, said part being axially spaced from the anchored end of said torsion bar, a second threaded part threadedly engaging said first threaded part and mounted for axially slidable and nonrotatable movement relative to said steering gear member so that torsional distortion of said torsion bar under load produces relative rotation between said parts and effects axial movement of said second part, a valve spool associated with said second threaded part, a hydraulic servo unit, a hydraulic power source, and means interconnecting said power source, valve spool and servo unit to enable said servo unit to be controlled by said axially movable valve spool.

2. The structure defined by claim 1 which is further characterized in that said torsion bar, said first and second threaded parts, and said valve spool are concentric with each other and with the axis of said stearing gear member and are wholly contained within said steering gear housing.

3. In a steering gear mechanism, a steering gear housing, a steering gear member rotatably mounted in said housing and having a bore formed therein, a torsion bar extending freely through the bore in said steering gear member and nonrotatably anchored at its lower end to said member, the opposite end of said torsion bar extending beyond the end of said steering gear member, a sleeve rigidly connected to the extending end of said torsion bar and having threads formed thereon, a second sleeve threadedly connected to said first sleeve and having a portion axially slidably and nonrotatably connected to said steering gear member so that torsional distortion of said torsion bar under load produces relative rotation between said first and second sleeves and effects axial movement of said second sleeve, a manually operable member operatively connected to the extending end of said torsion bar, a valve spool axially movable with said second sleeve, a hydraulic servo unit, a hydraulic power source, and means interconnecting said power source, valve spool and servo unit to enable said servo unit to be controlled by said valve spool.

4. In a steering gear mechanism, a steering gear housing, a steering gear member rotatably mounted in said housing and having a bore formed therein, a torsion bar having a central portion of smaller diameter than the diameter of said bore and freely extending through said bore, means nonrotatably anchoring the lower end of said torsion bar to said steering gear member, the opposite upper end of said torsion bar extending beyond the end of said member and having an enlarged head thereon, a sleeve rigidly connected to the enlarged head of said torsion bar and concentrically embracing a portion of said member, said sleeve having external threads thereon, an internally threaded nut threadedly engaging said externally threaded sleeve, means on said nut slidably and nonrotatably engaging said member, a manually operable member operatively connected to said interconnected torsion bar and sleeve to effect rotation thereof and to torsionally distort the reduced portion of said torsion bar to effect relative rotation between said sleeve and nut and consequent axial movement of said nut, a valve spool reciprocable with said nut, a hydraulic servo unit, a hydraulic power source, and means interconnecting said power source, valve spool and servo unit to enable said servo unit to be controlled by the axial movement of said valve spool.

5. The structure defined by claim 4 which is further characterized in that the lower end of said torsion bar is axially slidably but nonrotatably connected to said steering member, an axially adjustable member mounted in said steering gear member, and means connecting the lower end of said torsion bar to said axially adjustable member to permit axial adjustment of said torsion bar, sleeve, nut, and valve spool relative to said steering gear housing.

6. The structure defined by claim 4 which is further characterized in that said sleeve and the adjacent portion of said steering gear member have an angular lost motion connection therebetween permitting limited relative rotation between said sleeve and member in each direction to actuate said valve spool under normal conditions but insuring rotation of said sleeve and said steering gear member as a unit after said predetermined angular relative movement to provide manual steering in the event of failure of said torsion bar.

7. In a steering gear mechanism, a steering gear housing having a bore formed therein, a valve sleeve fixedly mounted within said bore, a valve spool slidably mounted within said valve sleeve and having an internally threaded part, an externally threaded sleeve threadedly engaging said internally threaded part, a relatively short torsion bar contained wholly within said steering gearing housing and connected at its upper end to said last mentioned sleeve, a steering gear member rotatably mounted within said housing and having an axial extension projecting into the lower end of said last mentioned sleeve, said steering gear member and said extension having an axial bore formed therein of greater diameter than the diameter of said torsion bar to freely receive said bar, means anchoring the lower end of said torsion bar to said steering gear member, and a manually operable member connected to said interconnected torsion bar and sleeve adjacent the upper end of said torsion bar to rotate the latter and torsionally distort said torsion bar to effect relative angular movement between said externally threaded sleeve and said internally threaded part to axially move said valve spool within said valve sleeve.

8. The structure defined by claim 7 which is further characterized in that the intermediate portion of said externally threaded sleeve is piloted upon the extension of said steering gear member, the inner end of said last mentioned sleeve having a lost motion angular connection to said extension to permit limited relative angular movement between said sleeve and said extension prior to unitary rotary movement thereof, and an axially slidable and nonrotatable connection between the lower end of said valve spool part and said extension to anchor said part against rotational movement with respect to said steering gear member while permitting axial movement relative thereto resulting from torsional distortion of said torsion bar.

No references cited.